United States Patent
Erdelitsch et al.

(10) Patent No.: US 6,382,708 B1
(45) Date of Patent: May 7, 2002

(54) ARRANGEMENT FOR CONTROLLING THE MOVEMENT OF A REARWARD-SIDE AIR GUIDING SYSTEM ON MOTOR VEHICLES

(75) Inventors: Georg Erdelitsch, Wiernsheim-Iptingen; Walter Haecker, Tamm; Thomas Jagodizinski, Leonberg; Herbert Mueller, Nuernberg; Johannes Preis, Bad Abbach/Lenfeld, all of (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/822,844

(22) Filed: Apr. 2, 2001

(30) Foreign Application Priority Data

Mar. 31, 2000 (DE) .......................................... 100 16 334

(51) Int. Cl.$^7$ ............................................... B62D 37/02
(52) U.S. Cl. ................................ 296/180.5; 296/180.1; 180/903
(58) Field of Search .......................... 296/180.1, 180.5, 296/180.2, 180.3, 180.4; 180/903

(56) References Cited

U.S. PATENT DOCUMENTS

| 2,932,370 A | * | 4/1960 | Kraus et al. ............. 296/180.5 |
| 4,773,692 A | * | 9/1988 | Schleicher et al. ...... 296/180.5 |
| 5,876,088 A | * | 3/1999 | Spears ...................... 296/180.2 |
| 5,923,245 A | * | 7/1999 | Klatt et al. ............... 296/180.1 |
| 6,170,904 B1 | * | 1/2001 | Schaedlich et al. ...... 296/180.1 |

FOREIGN PATENT DOCUMENTS

| DE | 197 41 321 | 12/1998 |
| EP | 0 698 546 | 2/1996 |

* cited by examiner

*Primary Examiner*—Stephen T. Gordon
*Assistant Examiner*—Jason Morrow
(74) *Attorney, Agent, or Firm*—Crowell & Moring LLP

(57) ABSTRACT

Arrangement for controlling the movement of a rearward-side air guiding system on motor vehicles, the rearward-side air guiding system having a rear spoiler provided on a rearward-side hood and a rear wing connected therewith, and the rear wing being movable by means of the arrangement from a retracted inoperative position into an extended operative position and vice versa. The arrangement for controlling the movement of the rear wing includes at least two telescopic tilt-out devices and one connection respectively between a driving device and the telescopic tilt-out device. The driving device contains a motor and at least one hydraulic cylinder, so that, when the motor (17) is triggered, a pressure is built up in the at least one hydraulic cylinder (18,18') which can be transmitted to the telescopic tilt-out devices (16,16') and has the effect that the rear wing (12) is moved against a spring force into its operative position.

12 Claims, 4 Drawing Sheets

ARRANGEMENT FOR CONTROLLING THE MOVEMENT OF A REARWARD-SIDE AIR GUIDING SYSTEM ON MOTOR VEHICLES

This application claims the priority of German Patent Document 100 16 334.3, filed Mar. 31, 2000, the disclosure of which is expressly incorporated by reference herein.

BACKGROUND AND SUMMARY OF THE INVENTION

The invention relates to the arrangement for controlling the movement of a rearward-side air guiding system on the motor vehicle.

German Patent Document DE 197 41 321 A1 describes a rearward-side air guiding system which is composed of a rear spoiler provided on a rearward-side hood and of a rear wing connected with the rear spoiler, and the rear wing being movable by means of a driving device from a retracted inoperative position into an extended operative position and vice versa. In the case of this known system, the driving device consists of a central geared motor which, by way of flexible drive shafts, is connected with two telescopic tilt-out devices carrying the rear wing. Each telescopic tilt-out device consists at least of an outer tube held in position on the rear spoiler and an inner tube connected with the rear wing, which inner tube carries out a linear displacement movement.

The arrangement according to the invention improves upon the known arrangement in that it can be implemented without high mechanical expenditures, and the restoring movement takes place automatically on the basis of the integrated spring arrangement. The providing of a hydraulic arrangement for the transmission of energy has the advantage that, in comparison to mechanical arrangements, it is significantly more resistant to wear and simultaneously generates less noise.

The providing of a fixedly mounted outer tube and of an inner tube, which can be displaced therein in the longitudinal direction, has the advantage that the construction provides an overall aesthetic appearance in the extended position of the rear wing and simultaneously, because of the visible cylindrical shape and the smooth surface, no dirt can be deposited which, in turn, increases the durability.

A bayonet catch on the telescopic tilt-out device for the connection with the rear wing has the advantage that the mounting is very simple and that, also in the event of a repair, the connection can be opened without any problems and subsequently can be reestablished.

Another advantage is achieved by a nozzle between the two hydraulic cylinders which, in the event of a nonuniform movement, ensures that a compensation of the hydraulic medium takes place between the hydraulic cylinders and the telescopic tilt-out devices which move in a uniform manner and therefore ensure a harmonic overall movement of the rearward-side air guiding system.

Other objects, advantages and novel features of the present invention will become apparent from the following detailed description of the invention when considered in conjunction with the accompanying drawings.

DETAILED DESCRIPTION OF THE PREFERRED EMBODIMENTS

Embodiments of the invention are illustrated in the drawing and will be explained in detail in the following.

FIG. 1 is a perspective basic view diagonally from the rear of the air guiding system, the driving device and the telescopic tilt-out devices;

FIG. 2 is a view of the drive unit with the connection to the telescopic tilt-out devices without any air guiding system;

FIG. 3 is a detailed view of the driving device; and

FIG. 4 is a detailed view of a telescopic tilt-out device.

BRIEF DESCRIPTION OF THE DRAWINGS

In FIG. 1, two spaced telescopic tilt-out devices 16 and 16' are provided for holding the rear wing 12.

Figure 1:
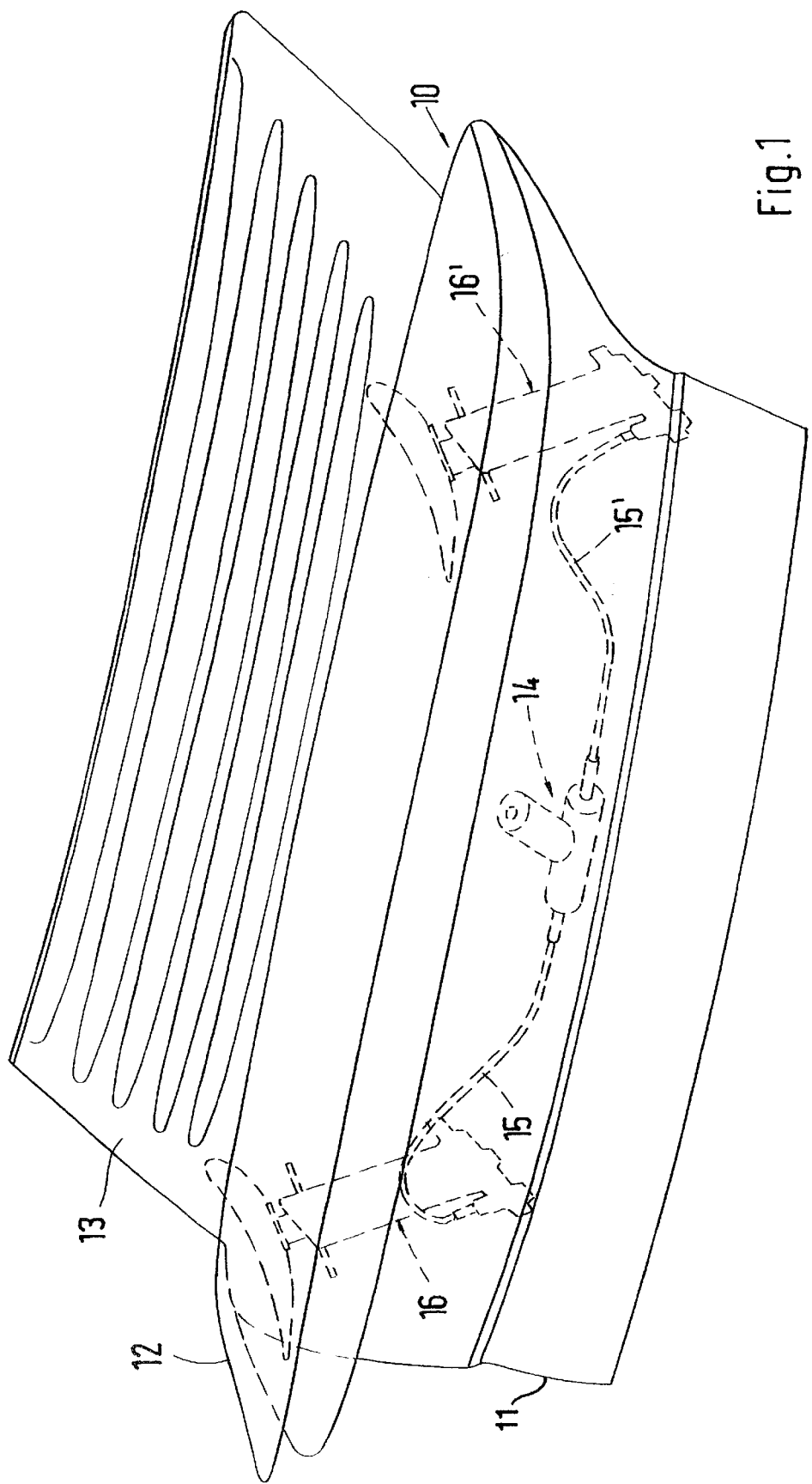
FIG. 1 is a basic perspective view diagonally from the rear of an air guiding system 10 which is composed of a stationary rear spoiler arranged on the rear top side and of a rear wing 12 connected therewith. The rear spoiler 11 is arranged on the rearward end of a rearward-side hood 13. The rear wing 12 can be displaced by means of a driving device 14 from a retracted inoperative position into an extended operative position and vice versa. The driving device 14 consists of a motor which, viewed in the transverse direction of the vehicle, is arranged approximately in the center. From the driving device 14, two connections 15 and 15' respectively extend to a telescopic tilt-out device 16 and 16' carrying the rear wing 12.
Figure 2:
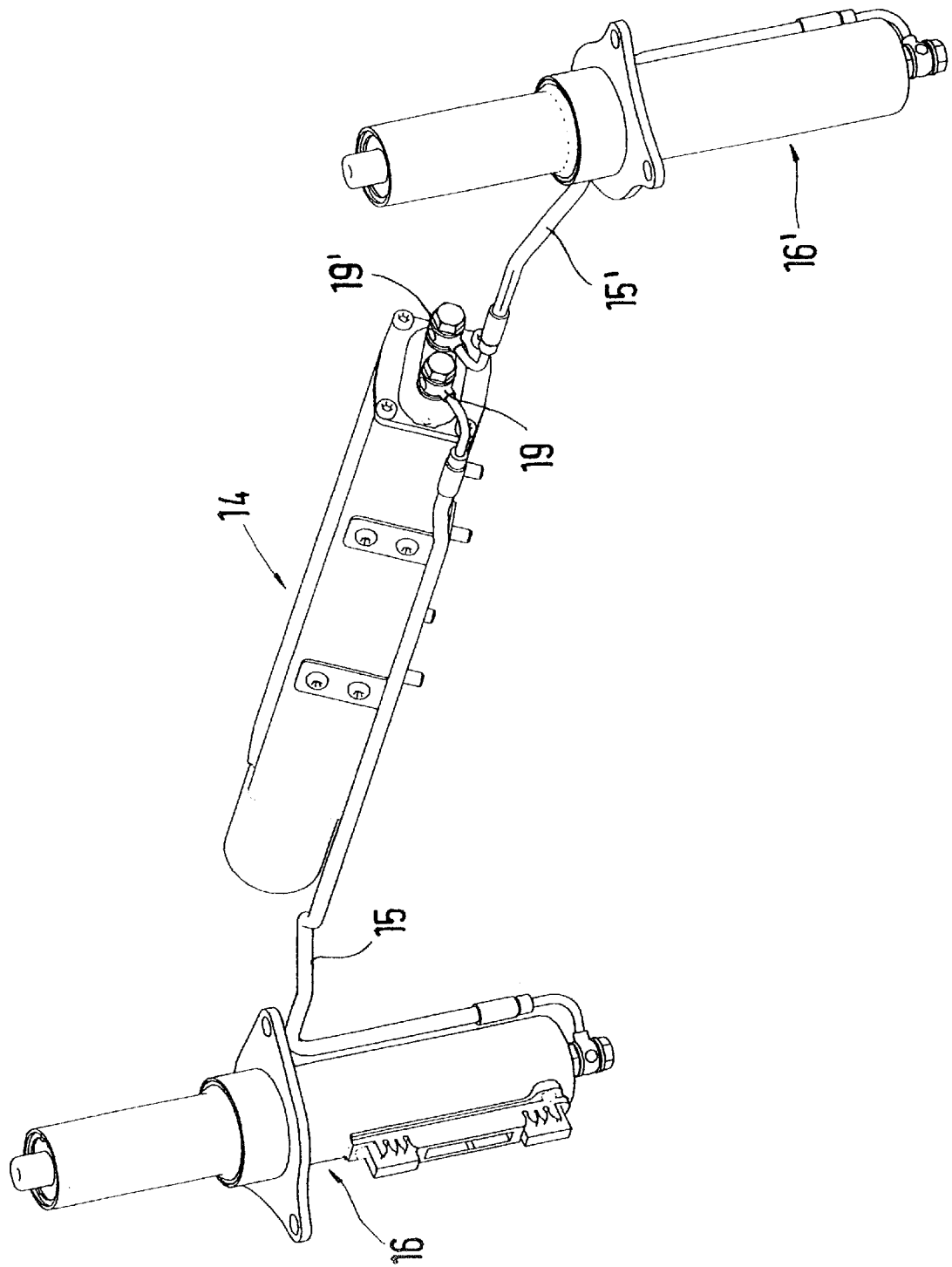
FIG. 2 illustrates the driving device with the connection to the telescopic tilt-out devices without any air guiding system, the same reference numbers being used for identical components. It is again clearly illustrated here that the driving device 14 is in each case connected by way of connections 15 and 15' with the telescopic tilt-out devices 16 and 16'. For this purpose, the drive unit has two outputs 19 and 19' to which the connections 15 and 15' are joined for forming the hydraulic unit.

The method of operation of the driving device in connection with the telescopic tilt-out devices is to be explained in the following by means of FIGS. 2 and 3.

Figure 3:
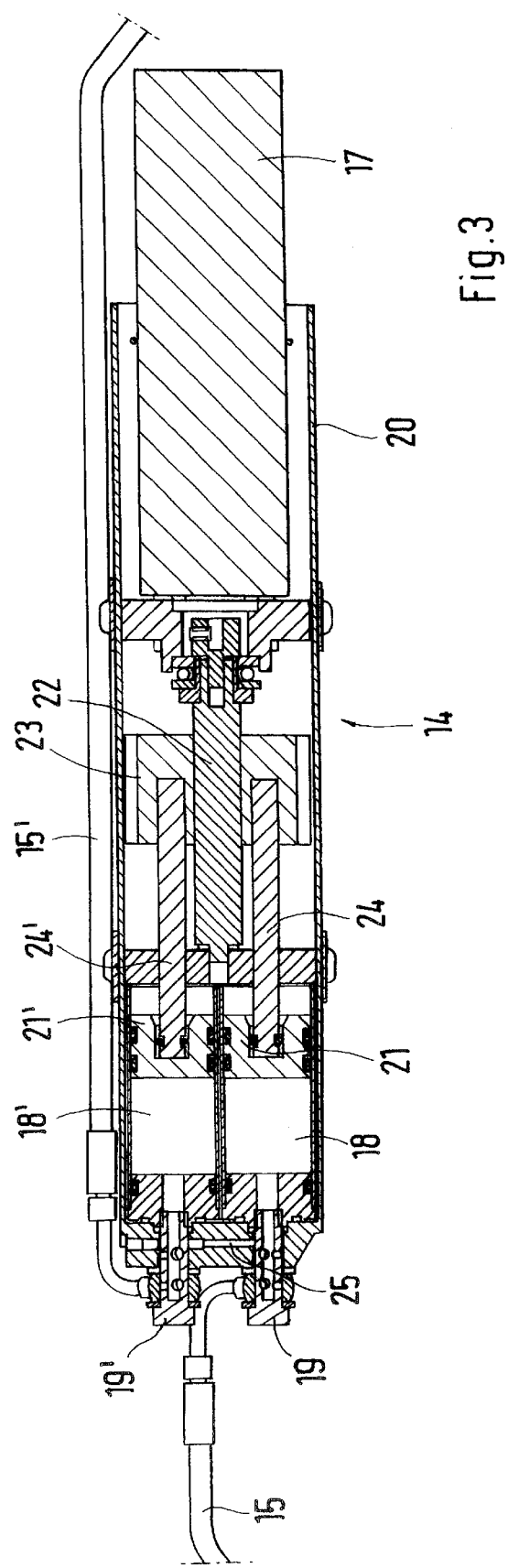

FIG. 3 is a partially sectional view of the driving device 14. The driving device 14 contains a motor 17 which is arranged in a cylindrical housing 18. On the side of the driving device 14 situated opposite the motor 17, two hydraulic cylinders 18 and 18' are arranged side-by-side with one hydraulic cylinder 18 being connected by way of an output 19 with the first connection 15 which extends to the telescopic tilt-out device 16. The pistons 21 and 21', which are both moved from the motor 14 by way of a corresponding constructive design, move in each case in the hydraulic cylinders 18 and 18'. When the motor 17 is triggered, a corresponding pressure is built up in the hydraulic cylinders 18 and 18', which pressure, by way of the outputs 19 and 19' as well as by way of the connections 15 and 15', causes a corresponding movement of the telescopic tilt-out devices 16 and 16'. The constructive design for the movement of the pistons 21 and 21' is as follows. In the housing 20 of the drive unit 14, a centrally arranged threaded spindle 22 is provided which is fixedly connected with the motor 17 and on which a slide 23 is movably arranged. When the motor 17 is triggered, this slide 23 moves in the direction of the side of the drive unit 14 situated opposite the motor 17. One connection element 24 and 24' respectively is provided from the slide to the pistons 21 and 21', which connection element 24 and 24' moves the pistons into the direction of a reduction of the size of the hydraulic cylinder and thus, in the piston-cylinder unit, by way of the hydraulic effect and the connection with the telescopic tilt-out devices, the latter are then moved into their operative position. The mutually connected components-connection element 24, 24' and piston 21,21'— are connected with a definable play which permits a relative movement of these two components with respect to one another. At the outputs 19 and 19' of the hydraulic cylinders, a nozzle 25 is provided by means of which, in the event of a varying movement of the telescopic tilt-out devices, for example, because of a leakage of hydraulic liquid in one of the cylinders, a compensation of the hydraulic liquid and therefore again a uniform movement of the two telescopic tilt-out devices 16 and 16' is ensured, so that a harmonic sequence of the movements of the rear wing is achieved. The connection of the connection element and the piston with a definable play makes it possible that, when the rear wing is returned into its inoperative position, the system can be completely depressurized, whereby a gap-free fit of the rear wing on the rear spoiler is obtained.

Figure 4:
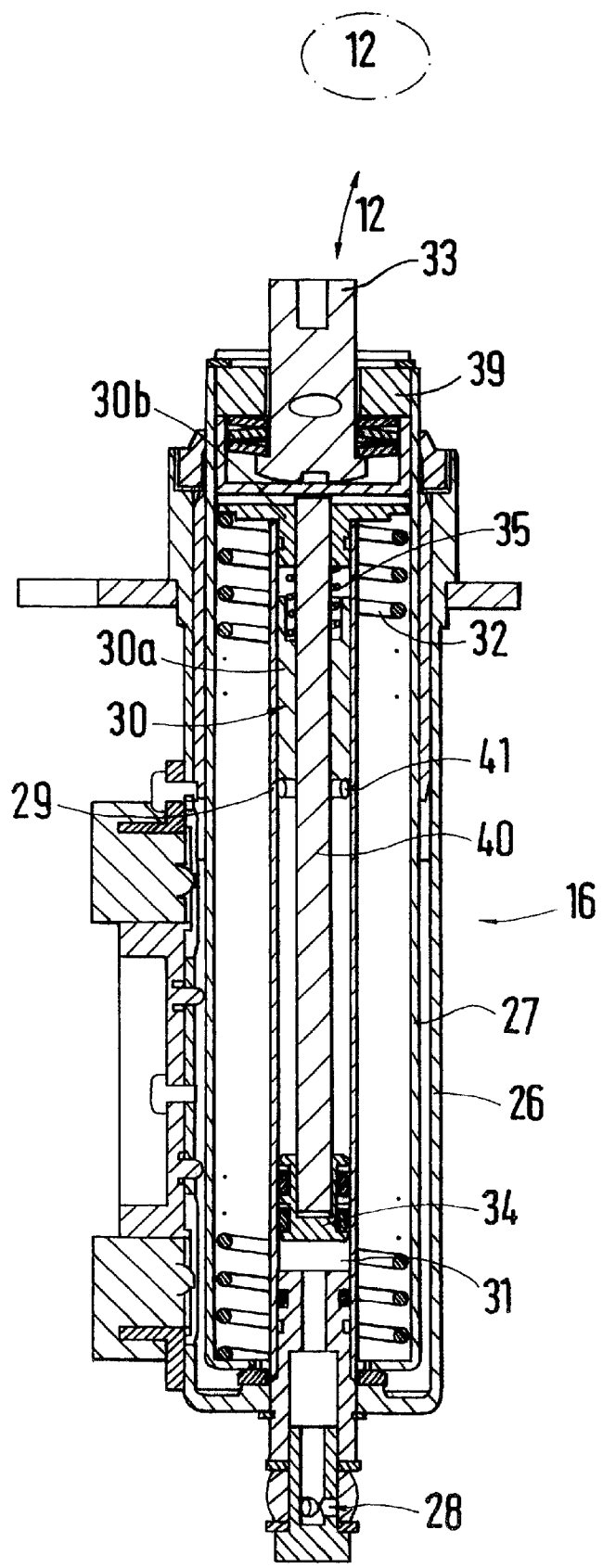

FIG. 4 is a partially sectional representation of a telescopic tilt-out device 16, so that its construction and method of operation can be explained by means of the figure. The telescopic tilt-out device comprises a stationary outer tube 26 and in inner tube 27 which can be displaced in the vertical direction, the stationary outer tube 26 being fastened on the stationary rear spoiler 11, and the displaceable inner tube 27 being connected with the rear wing 12. The basic function of the telescopic tilt-out device is illustrated in the initially cited German Patent Document DE 197 43 321 A1. When the air guiding system is controlled for a moving-out of the rear wing, the inner tube 27 is moved out of the stationary outer tube 26. In the arrangement according to the invention, an input 28 is provided on the side of the telescopic tilt-out device 16 which is situated on the side facing the rear spoiler, to which input 28 the connection 15 which is not shown here is led for transmitting the hydraulic liquid. In the displaceable inner tube 27, another centrally arranged inner tube 29 of a smaller diameter is arranged which is firmly anchored analogous to the outer tube. The displaceable inner tube 27 essentially has the shape of a sleeve with a closed bottom on the side facing the rear spoiler. The centrally arranged inner tube 26 projects only through an opening on the closed bottom so that, when the rear wing moves out, the displaceable inner tube 27 moves along on the fixedly mounted centrally arranged inner tube 29. The displaceable inner tube 27 has an end piece 39 which, in the center, is connected with a connecting rod 40 which, in turn, is disposed in the fixedly mounted, centrally arranged inner tube 29. In addition, a stamp-shaped arrangement 30 is contained centrally in the inner tube 29, which stamp-shaped arrangement 30 is not moved along during a movement of the movably arranged inner tube 27 for the moving-out of the telescopic tilt-out devices 16 and 16'. On the end of the connecting rod 40 facing the rear spoiler, an end piece 34 is arranged such that a hollow space 31 is created which is part of the hydraulic system. When the motor of the drive unit is triggered, hydraulic liquid is pumped into this hollow space 31 and, by way of this pressure, the connecting rod 40 with the end piece 39 is hydraulically moved such that, as a result of the fixed connection with the inner tube 27, a displacement of the inner tube 27 out of the outer tube 26 takes place. Between the inner tube 27 and the smaller inner tube 29, a spring 32 is arranged which is only partially shown here. During the moving-out of the displaceable unit, the closed bottom of the displaceable inner tube 27 takes along the spring 32 and tensions it against its spring force during the movement of the rear wing 12. The tensioned spring causes a restoring of the displaceable unit in an interaction with a pressure reduction during the return movement of the slide 23 by the motor 17. The spring 32 thereby promotes the return movement of the pistons in the hydraulic cylinders by its relaxation operation. On the rear-wing-side end of the telescopic tilt-out device, a bayonet catch 33 is provided for fastening the telescopic tilt-out device on the rear wing, which bayonet catch 33 permits a very simple mounting of the telescopic tilt-out device on the rear wing.

In the following, the implementation of the compensation of the hydraulic liquid is to be described which takes place by way of the nozzle 25 of the drive unit 14 mentioned with respect to FIG. 3. In principle, by way of this nozzle, a compensation of hydraulic liquid will always take place when in one of the two hydraulic systems the pressure is higher than in the other. It was found that the compensation is the most effective, when the telescopic tilt-out device has moved out and a correspondingly high pressure therefore exists in the hydraulic cylinders. For reinforcing this effect, a second spring 35 is provided in the case of both telescopic tilt-out devices within the smaller inner tube 29 in the area of the stamp-shaped arrangement 30. The stamp-shaped arrangement 30 is essentially composed of two parts 30a and 30b, between which the second spring 35 is situated. In the case of a pressure buildup by a corresponding controlling of the motor 17, hydraulic liquid is pumped into the hollow space 31, and the connecting rod with its end piece 34 is therefore moved in the direction of the stamp-shaped arrangement 30 until the end piece 34 has reached the stamp-shaped arrangement 30. This can be detected, for example, by way of a correspondingly arranged end position switch 41. In FIG. 3, this end position switch is arranged on the stamp-shaped arrangement, specifically on the side facing the end piece 34. However, an attachment on the moving end piece 34 is also conceivable. When the rear wing has moved out so far that this position has been reached, part 30a of the stamp-shaped arrangement 30 is pressed against the spring force of the spring 35 against the part 30b. As a result of the spring 35, the pressure in the hydraulic system increases, and in the event that one of the two telescopic tilt-out devices has moved out farther than the other, the pressure in this hydraulic system will then be higher, and a corresponding compensation will take place by way of the nozzle 25.

For monitoring the movement of the telescopic tilt-out device, switches are provided between the outer tube 26 and the inner tube 27, which each detect the position of the inner tube. These switches for controlling the movement of the telescopic tilt-out devices can be provided in both telescopic tilt-out devices as well as in only one tilt-out device. In a meaningful manner, a monitoring of the implemented compensation operations can also take place and, in the event of a disproportionately high number of compensation operations, a conclusion can be drawn with respect to an error in the system, which can then be visually and/or acoustically indicated to the driver.

This hydraulic movement of the rear wing of the air guiding arrangement is characterized by a simple construction which is free of mechanical parts which are subject to wear.

In addition to the use of hydraulic liquid, the use of any other suitable medium, such as cooling liquid, is also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for controlling movement of a rearward-side air guiding system on motor vehicles, the system having a rear spoiler provided on a rearward-side hood and a rear wing connected with said rear spoiler wherein said rear wing is moveable by the arrangement from a retracted inoperative position into an extended operative position and vice versa, the arrangement for controlling the movement of the rear wing comprising:
 a driving device having a motor and at least one hydraulic cylinder;
 at least two telescopic tilt-out devices;
 a connection device positioned between the driving device and the telescopic tilt-out devices; wherein, when the motor is triggered, pressure is built up in said at least one hydraulic cylinder and transmitted to said telescopic tilt-out devices whereby the rear wing is moved into its operative position against a spring force.

2. The arrangement according to claim 1,
 wherein the telescopic tilt-out device has an outer tube held in position on the rear spoiler and a first inner tube connected with the rear wing, and the first inner tube of the telescopic tilt-out device is displaced in the outer tube in the longitudinal direction.

3. The arrangement according to claim 2,
 wherein the first inner tube contains a second inner tube which has a smaller diameter, is firmly connected with the outer tube and cannot be moved, and a spring is arranged between the outer wall of the smaller second inner tube and the interior wall of the first inner tube, so that the spring is tensioned or relaxed during a movement of the inner tube.

4. The arrangement according to claim 2, wherein the displaceable first inner tube has a bayonet catch on its end facing the rear wing, by means of which the bayonet catch of the telescopic tilt-out device can be fastened on the rear wing.

5. The arrangement according to claim 1,
 wherein the driving device, viewed in the transverse direction of the vehicle, is arranged approximately in the center, and the driving device has as many outputs as telescopic tilt-out devices and one hydraulic connection respectively is arranged between the outputs and the telescopic tilt-out devices.

6. The arrangement according to claim 1,
 wherein one hydraulic cylinder respectively exists for each telescopic tilt-out device, and the hydraulic cylinders are connected with one another in the direct proximity of their outputs by way of a nozzle.

7. A rearward-side air guiding system for a motor vehicle, said system comprising:
 a rear spoiler provided on a rearward-side hood;
 a rear wing connected with said rearward rearward-side hood;
 a driving device for moving said rear wing from a retracted inoperative position into an extended operative position and back into said retracted inoperative position, said driving device comprising:
 a motor and at least one hydraulic cylinder;
 at least two telescopic tilt-out devices;
 a connection device positioned between the driving device and the telescopic tilt-out device wherein when said motor is triggered, pressure is built up in said at least one hydraulic cylinder and transmitted to the telescopic tilt-out devices whereby the rear wing is moved into its operative position against a spring force.

8. The air guiding system according to claim 7,
 wherein the telescopic tilt-out device has an outer tube held in position on the rear spoiler and a first inner tube connected with the rear wing, and the first inner tube of the telescopic tilt-out device is displaced in the outer tube in the longitudinal direction.

9. The air guiding system according to claim 8,
 wherein the first inner tube contains a second inner tube which has a smaller diameter, is firmly connected with the outer tube and cannot be moved, and a spring is arranged between the outer wall of the smaller second inner tube and the interior wall of the first inner tube, so that the spring is tensioned or relaxed during a movement of the inner tube.

10. The air guiding system according to claim 8, wherein the displaceable first inner tube has a bayonet catch on its end facing the rear wing, by means of which the bayonet catch of the telescopic tilt-out device can be fastened on the rear wing.

11. The air guiding system according to claim 7,
 wherein the driving device, viewed in the transverse direction of the vehicle, is arranged approximately in the center, and the driving device has as many outputs as telescopic tilt-out devices and one hydraulic connection respectively is arranged between the outputs and the telescopic tilt-out devices.

12. The air guiding system according to claim 7,
 wherein one hydraulic cylinder respectively exists for each telescopic tilt-out device, and the hydraulic cylinders are connected with one another in the direct proximity of their outputs by way of a nozzle.

* * * * *